Aug. 15, 1950  I. B. BENSEN  2,519,015
SONIC AIR-SPEED AND STALL INDICATOR
Filed Nov. 23, 1948
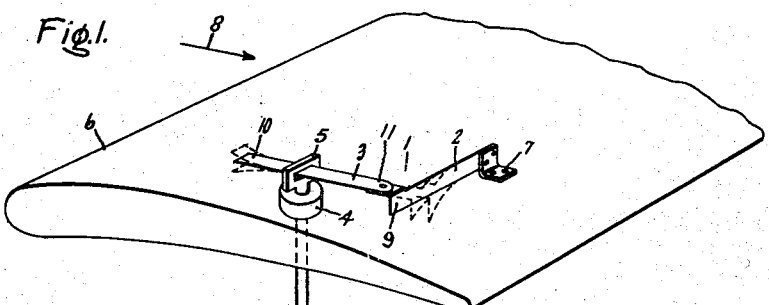
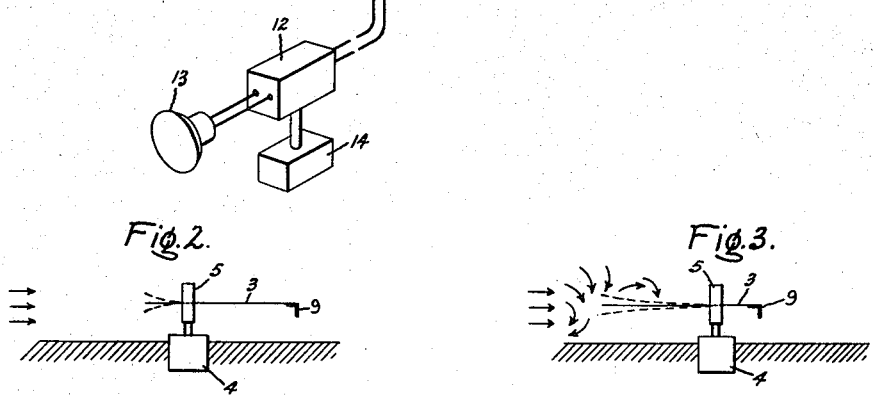
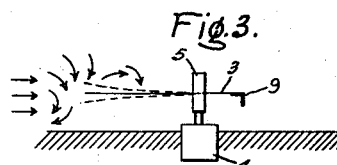
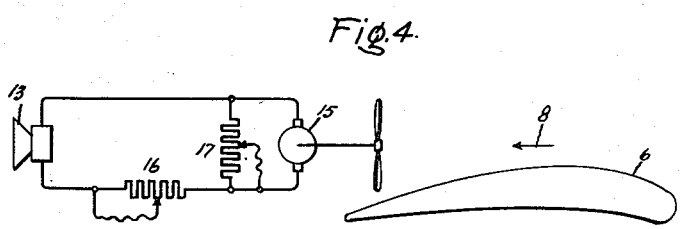
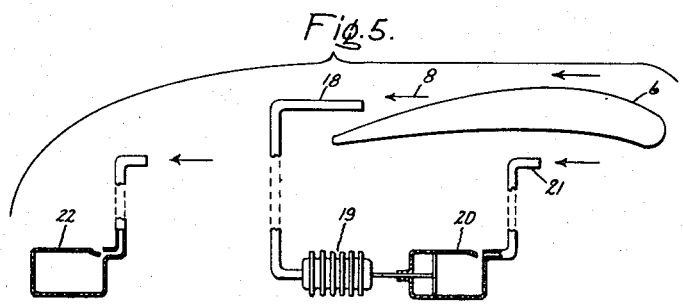
Inventor:
Igor B. Bensen,
by Richard E. Hosley
His Attorney.

Patented Aug. 15, 1950

2,519,015

UNITED STATES PATENT OFFICE 2,519,015

SONIC AIR-SPEED AND STALL INDICATOR

Igor B. Bensen, Alplaus, N. Y., assignor to General Electric Company, a corporation of New York Application November 23, 1948, Serial No. 61,678

5 Claims. (Cl. 177—311)

This invention relates to aircraft and more particularly to flight condition indicators for use in connection therewith.

At the present time, continuous indication of air speed is provided by dials on the dashboard of the plane. However, during maneuvering of any kind, the pilot's attention is too preoccupied to afford additional observation of instruments with the result that the plane is rendered particularly susceptible to the danger of stalling, and many fatal accidents have been caused by inability of pilots to recognize a stalling condition.

This hazard has been recognized by manufacturers and others interested in safety of aircraft in flight and various devices have been offered as sonic rather than visual indicators of a stalling condition.

It is an object of this invention to provide a sonic indicator which produces a continuous audio signal of air speed as well as an audio signal of an approach to a stalling condition.

Such a device will aid the pilot in maintaining a constant cruising speed and also warn him of an approaching stall condition before it is too late to correct his fault.

In general, my invention comprises three elements, namely, a signal producing member whose frequency is proportional to a function of airspeed, means for audibly reproducing the signal, and means for producing a reference tone of constant frequency.

For an understanding of the invention and of the improvements herein disclosed, reference should be had to the following specification and the accompanying drawing wherein like reference characters denote like or corresponding parts throughout the several views.

In the drawing, Fig. 1 is a diagrammatic view of one form of my invention; Fig. 2 is a diagrammatic view of a portion of Fig. 1 indicating a high speed condition; Fig. 3 is a diagrammatic view of the same portion as Fig. 2 indicating a stall condition; Fig. 4 is a diagrammatic view of an alternative form of my invention; and Fig. 5 is a diagrammatic view of another alternative form of my invention.

Referring to the drawing, Figs. 1 to 3, inclusive, show one form of sonic airspeed and stall indicator illustrative of my invention, which will now be described in detail.

As shown in Fig. 1, I have provided a signal producing member 1 comprising a leaf spring 2, a reed 3, and an electrical pickup 4 having an actuating member or feeler tip 5. (The signal producing member may alternatively comprise elements ranging from the purely acoustical, such as a whistle, to the purely electrical, such as velocity type crystal pickups). Member 1 is installed on the upper surface of an airplane wing 6 where the stall condition is known to occur earlier than on any other part of the wing. End 7 of leaf spring 2 is secured to the wing surface in any suitable manner leaving the main body of the spring positioned broadside to cruising air stream 8. As so positioned, the end 9 of leaf spring 2 is resiliently responsive to changes in the force of air stream 8. Reed 3 has one free end 10 directed into the air stream and another end 11 pivotally secured to the end 9 of leaf spring 2. Pickup 4 is also secured to the surface of wing 6 and lies adjacent reed 3 which passes freely through the feeler tip 5 of pickup 4. The free end 10 of reed 3 oscillates under the effect of the air stream 8, and this oscillation is transmitted to the electrical pickup 4 by means of the feeler tip 5 to produce electrical signals. These electrical signals are fed into an amplifier 12 and finally into a loud speaker or head phones 13. Thus, the pilot can hear the signals produced by the vibrating reed.

Simultaneously, the amplifier 12 has an audio frequency tone generator 14 electrically connected to it. Generator 14 produces an audible tone of present frequency, such as 1000 cycles per second, for example. This tone pulses intermittently on and off to distinguish it from the signal member tone. Thus two tones are heard simultaneously from the loud speaker. The generator 14 may have an adjusting knob for the pilot to adjust its tone frequency in flight to the frequency of the signal member at cruising speed. When cruising then, both tones fully overlap and sound like one.

To show the effect of a change in air stream 8 resulting from a change in speed of the plane, Figs. 2 and 3 are provided.

Fig. 2 indicates an increase in airspeed above cruising, and under such a condition the leaf spring 2 is bent back by the increased aerodynamic force of the airstream 8. Since end 9 of leaf spring 2 is pivotally connected to reed 3, leaf spring 2 pulls reed 3 with it, thus shortening the free length of reed 3 (i. e. the length between feeler tip 5 and reed end 10) and raising its resonance frequency. The pilot is thus given an audio signal of increased frequency above his reference tone frequency and is thereby advised of an increase in speed above cruising.

Fig. 3 indicates the opposite effect, i. e. a decrease in speed below cruising. In this case, the free length of reed 3 is lengthened because of decrease in the aerodynamic force of the airstream 8 and the resonance frequency of the reed 3 is lowered. This decrease in frequency of the signal member tone taken in conjunction with the reference tone of constant frequency advises the pilot of a decrease in speed below cruising.

Fig. 3 also shows the effect of having the speed so decreased as to approach the stall condition. Under this condition the free length of reed 3 is at its maximum and an air turbulence occurs which produces downward forces causing the reed end 10 to strike the wing surface, the surface of wing 6 being reinforced at this point. The result of the free end of reed 3 striking the surface of wing 6 is the production of a violent irregular rumble in the loud speaker which cannot be mistaken by the pilot for anything else and which indicates an approaching stall condition. Moreover, since the signal producing member 1 is installed at a point on the wing 6 where the stall is known to occur earlier than on any other part of the wing, the pilot is warned of approaching stall conditions before the whole wing is fully stalled, thus providing him a margin of time to correct for his fault.

This air speed and stall indicator also gives the pilot ample early warning of carburetor and wing's icing, since when the cruising speed begins to decrease, whether or not accompanied by a decrease in engine speed (the engine controls not having been touched), the pilot is warned of impending trouble.

The device also has advantages in teaching flying novices and in indicating high speed stalls.

It will be noted that the form of my invention illustrated in Figs. 1-3, inclusive, involves an amplifier and an audio frequency generator, both of which require electrical standby power. Figs. 4 and 5 illustrate alternate forms of my invention in which this requirement is eliminated.

Referring to Fig. 4 in detail, it will be seen that I have provided a miniature alternating current generator 15 which is driven by the flow of air over the surface of wing 6. In this version of my invention, the generator speed, and therefore the audio frequency, are proportional to the air flow 8 over wing 6. The two resistors 16 and 17 are used to control the volume and generator speed respectively. A loud speaker or headphones 13 are electrically connected in this circuit as shown.

Referring to Fig. 5, it will be seen that I have provided a purely acoustical arrangement which also eliminates the necessity of electrical standby power. In this version, an impact tube 18 is installed above the surface of wing 6 where the stall condition occurs first. This impact tube 18 leads to the cabin of the airplane where it actuates a Sylphon bellows 19 which in turn varies the column of oscillating air in a whistle 20. The whistle itself is powered by the air flow supplied through a separate impact tube 21 located elsewhere on the ship. Another whistle 22 of standard frequency is provided for comparison.

Although exemplary forms of my invention have been shown in the accompanying drawings and described herein in detail, it is to be understood that the disclosures are not intended to be restrictive but that each may embody various modifications in detail structure without departing from the spirit of the invention or the scope of the appended claims.

What I claim as new and desire to secure by Letters Patent of the United States is:

1. A sonic airspeed and stall indicator adapted to be secured to the wing of an airplane comprising a leaf spring having one end adapted to be secured on the wing and its body resiliently responsive to airflow over said wing, a reed having one end pivotally secured to the movable end of said leaf spring and its other free end directed into said air flow and arranged to be vibrated in response to said air flow, an electrical pickup adapted to be mounted on the wing adjacent said reed, a feeler tip on said pickup through which said reed passes freely, audio amplifying and reproductive means electrically connected to said electrical pickup, and an audio frequency tone generator electrically connected to said amplifying means.

2. A sonic airspeed and stall indicator adapted to be secured to the wing of an airplane comprising a leaf spring having one end adapted to be secured on the wing and its body resiliently responsive to air flow over said wing, a reed having one end pivotally secured to the movable end of said leaf spring and its other free end directed into said air flow and arranged to be vibrated in response to said air flow, an electrical pickup adapted to be mounted on the wing adjacent said reed, a feeler tip on said pickup through which said reed passes freely, audio amplifying and reproductive means electrically connected to said electrical pickup, an audio frequency tone generator electrically connected to said amplifying means, and an adjustable frequency sonic device adapted to be used as a reference tone.

3. In a signalling system, a movable body, a reed attached to said movable body and positioned in the air stream flowing about said body to be vibrated in response to said air stream, means automatically adjusting the vibratory length of said reed in proportion to airspeed, an electrical pickup mounted on said movable body adjacent said reed and adapted to be actuated by said reed, audio amplifying and reproductive means connected to said electrical pickup, and an audio frequency tone generator electrically connected to said amplifying means.

4. In an airplane sonic stall and speed indicator, the combination with the upper surface of an airplane wing of a leaf spring having one end secured to said wing and its other free end resiliently responsive to air flow over said wing, an elongated reed having one end pivotally attached to said free end of said leaf spring and its other end free and arranged to be vibrated in response to said air flow, an electrical pickup secured to said wing adjacent said reed, a feeler tip on said pickup through which said reed passes freely, audio amplifying and reproductive means electrically connected to said electrical pickup, and an audio frequency tone generator electrically connected to said amplifying means.

5. In an airplane sonic stall and speed indicator, the combination with the upper surface of an airplane wing of a leaf spring having one end secured to said wing and its other free end resiliently responsive to air flow over said wing, an elongated reed having one end pivotally attached to said free end of said leaf spring and its other end free and arranged to be vibrated in response to said air flow, an electrical pickup secured to said wing adjacent said reed, a feeler tip on said pickup through which said reed passes freely, audio amplifying and reproductive means electrically connected to said electrical pickup, and an adjustable frequency sonic device adapted to be used as a reference tone.

IGOR B. BENSEN.

REFERENCES CITED

The following references are of record in the file of this patent:

UNITED STATES PATENTS

| Number | Name | Date |
|---|---|---|
| 1,999,215 | Smith | Apr. 30, 1935 |
| 2,051,827 | De Florez | Aug. 25, 1936 |
| 2,094,001 | De Florez | Sept. 28, 1937 |
| 2,328,730 | Lorenzen | Sept. 7, 1943 |
| 2,386,992 | Trott | Oct. 16, 1945 |